(12) United States Patent
Fried

(10) Patent No.: US 12,356,293 B2
(45) Date of Patent: Jul. 8, 2025

(54) ENHANCED ENTERPRISE DATA COMMUNICATIONS WITH MOBILE DEVICES

(71) Applicant: Flash App, LLC, Norcross, GA (US)

(72) Inventor: Lance Fried, Aventura, FL (US)

(73) Assignee: FLASH APP, LLC, Norcross, GA (US)

( * ) Notice: Subject to any disclaimer, the term of this patent is extended or adjusted under 35 U.S.C. 154(b) by 0 days.

(21) Appl. No.: 17/388,903

(22) Filed: Jul. 29, 2021

(65) Prior Publication Data

US 2023/0031032 A1 Feb. 2, 2023

(51) Int. Cl.
| | |
|---|---|
| *H04L 9/32* | (2006.01) |
| *G06F 16/955* | (2019.01) |
| *H04M 3/537* | (2006.01) |
| *H04W 4/021* | (2018.01) |
| *H04W 4/12* | (2009.01) |

(52) U.S. Cl.
CPC ............ *H04W 4/12* (2013.01); *G06F 16/955* (2019.01); *H04M 3/537* (2013.01); *H04W 4/021* (2013.01)

(58) Field of Classification Search
CPC ....... H04W 4/12; H04W 4/021; G06F 16/955; H04M 3/537
See application file for complete search history.

(56) References Cited

U.S. PATENT DOCUMENTS

| | | |
|---|---|---|
| 6,977,993 B2 | 12/2005 | Starbuck et al. |
| 7,627,828 B1 | 12/2009 | Collison et al. |
| 7,917,505 B2 | 3/2011 | Van Gent et al. |
| 8,150,989 B2 * | 4/2012 | Mostafa .................. H04L 67/04 709/217 |
| 8,396,514 B2 | 3/2013 | Adams |

(Continued)

FOREIGN PATENT DOCUMENTS

| | | |
|---|---|---|
| KR | 100616318 B1 | 8/2006 |
| KR | 100845348 B1 | 7/2008 |

(Continued)

OTHER PUBLICATIONS

Google Patents, "A system and method for providing originator information display service using multi-media messaging", KR100616318B1, Abstract English Translation, p. 1. (Year: 2006).

(Continued)

*Primary Examiner* — Dai Phuong
(74) *Attorney, Agent, or Firm* — Stetina Garred Brucker & Newboles

(57) ABSTRACT

The present disclosure is directed to various systems and methods for enhanced outbound dialing and notifications. An originating network interface is connectible to the originating network, and receptive to a media content request from the originating network. A database stores one or more originator node records, defined at least by an originator node identity, a network node address, and a media content element. A communications session processor retrieves the media content element associated with the originator node record from the database. A terminating network interface is connectible to the terminating network, and the media content element is transmitted on to the terminating network and destined for the recipient node through the terminating network interface.

29 Claims, 14 Drawing Sheets

(56) References Cited

U.S. PATENT DOCUMENTS

| | | | |
|---|---|---|---|
| 8,572,684 B1* | 10/2013 | Sama | H04L 63/0838 |
| | | | 726/4 |
| 8,577,000 B1 | 11/2013 | Brown | |
| 8,799,794 B2 | 8/2014 | Cobb et al. | |
| 8,817,062 B2* | 8/2014 | Howarter | H04N 21/4788 |
| | | | 379/142.07 |
| 8,913,726 B2 | 12/2014 | Brown et al. | |
| 8,959,650 B1 | 2/2015 | Richards et al. | |
| 9,584,493 B1 | 2/2017 | Leavy et al. | |
| 9,615,222 B2* | 4/2017 | Wen | H04L 67/141 |
| 9,634,855 B2 | 4/2017 | Poltorak | |
| 9,667,810 B1* | 5/2017 | Brown | H04M 15/8355 |
| 9,679,336 B2 | 6/2017 | Papakipos et al. | |
| 9,781,066 B2 | 10/2017 | Park et al. | |
| 9,800,723 B2 | 10/2017 | Gao et al. | |
| 10,332,218 B2 | 6/2019 | Papakipos et al. | |
| 10,432,784 B2 | 10/2019 | Sapci | |
| 10,523,811 B2 | 12/2019 | Moon | |
| 10,523,814 B1* | 12/2019 | Moore | H04M 3/493 |
| 10,951,567 B2 | 3/2021 | Fried | |
| 10,965,630 B2 | 3/2021 | Fried | |
| 10,992,621 B2 | 4/2021 | Fried | |
| 2002/0172338 A1 | 11/2002 | Lee et al. | |
| 2004/0179039 A1 | 9/2004 | Blattner et al. | |
| 2005/0216550 A1 | 9/2005 | Paseman et al. | |
| 2006/0026277 A1 | 2/2006 | Sutcliffe | |
| 2006/0052091 A1 | 3/2006 | Onyon et al. | |
| 2007/0047523 A1 | 3/2007 | Jiang | |
| 2007/0116251 A1 | 5/2007 | Seo | |
| 2007/0173236 A1 | 7/2007 | Vishwanathan et al. | |
| 2007/0192428 A1 | 8/2007 | Goldfarb et al. | |
| 2007/0296739 A1 | 12/2007 | Lonn | |
| 2008/0032670 A1 | 2/2008 | Wada et al. | |
| 2008/0037717 A1 | 2/2008 | Seelig et al. | |
| 2008/0120176 A1 | 5/2008 | Batni et al. | |
| 2008/0133641 A1 | 6/2008 | Gent et al. | |
| 2008/0250066 A1 | 10/2008 | Ekstrand et al. | |
| 2009/0054092 A1 | 2/2009 | Stonefield et al. | |
| 2009/0109957 A1 | 4/2009 | Caradec et al. | |
| 2009/0116624 A1 | 5/2009 | Xue | |
| 2009/0138952 A1* | 5/2009 | Won | H04L 9/3297 |
| | | | 726/9 |
| 2009/0143052 A1 | 6/2009 | Bates et al. | |
| 2009/0276839 A1 | 11/2009 | Peneder | |
| 2009/0290697 A1* | 11/2009 | Adams | H04M 1/576 |
| | | | 379/142.04 |
| 2009/0296904 A1 | 12/2009 | Brewer et al. | |
| 2010/0014647 A1 | 1/2010 | Subramaniam | |
| 2010/0029308 A1 | 2/2010 | Tims et al. | |
| 2010/0061541 A1 | 3/2010 | Ke et al. | |
| 2010/0088430 A1 | 4/2010 | Ton et al. | |
| 2010/0135473 A1 | 6/2010 | Dewing et al. | |
| 2010/0233997 A1 | 9/2010 | Hou | |
| 2011/0014932 A1 | 1/2011 | Estevez | |
| 2011/0197163 A1 | 8/2011 | Jegal et al. | |
| 2011/0283190 A1 | 11/2011 | Poltorak | |
| 2011/0288897 A1 | 11/2011 | Erhart et al. | |
| 2013/0023238 A1 | 1/2013 | Kaplan et al. | |
| 2013/0102297 A1 | 4/2013 | Chavernac | |
| 2013/0103765 A1 | 4/2013 | Papakipos et al. | |
| 2013/0179156 A1 | 7/2013 | Fried et al. | |
| 2013/0254233 A1 | 9/2013 | Fagundes et al. | |
| 2013/0286223 A1* | 10/2013 | Latta | H04N 1/00151 |
| | | | 348/207.1 |
| 2014/0023183 A1 | 1/2014 | Brown et al. | |
| 2014/0025750 A1 | 1/2014 | Dawar et al. | |
| 2014/0074728 A1 | 3/2014 | Margulies | |
| 2014/0141888 A1 | 5/2014 | Pavlish | |
| 2014/0157148 A1 | 6/2014 | Joo et al. | |
| 2014/0161241 A1 | 6/2014 | Baranovsky et al. | |
| 2014/0245180 A1 | 8/2014 | Kuramura et al. | |
| 2015/0007351 A1 | 1/2015 | Janajri et al. | |
| 2015/0038128 A1 | 2/2015 | Martin | |
| 2015/0038131 A1* | 2/2015 | Wen | H04W 12/06 |
| | | | 455/418 |
| 2015/0172336 A1 | 6/2015 | Guignon et al. | |
| 2015/0248389 A1 | 9/2015 | Kahn et al. | |
| 2015/0288640 A1 | 10/2015 | Lee | |
| 2015/0304490 A1 | 10/2015 | Huang et al. | |
| 2016/0014059 A1 | 1/2016 | Rathod | |
| 2016/0057609 A1 | 2/2016 | Nebel | |
| 2016/0094708 A1 | 3/2016 | Brown | |
| 2016/0219142 A1 | 7/2016 | Brown | |
| 2016/0219150 A1 | 7/2016 | Brown | |
| 2016/0294894 A1 | 10/2016 | Miller | |
| 2017/0083172 A1 | 3/2017 | Schneider, IV et al. | |
| 2017/0278198 A1 | 9/2017 | Papakipos et al. | |
| 2017/0279751 A1 | 9/2017 | Quirarte et al. | |
| 2017/0359431 A1 | 12/2017 | Sherratt et al. | |
| 2018/0295232 A1 | 10/2018 | Sapci | |
| 2018/0302513 A1* | 10/2018 | Cohen | H04M 3/42382 |
| 2018/0341383 A1 | 11/2018 | Sully | |
| 2019/0037172 A1 | 1/2019 | Choi et al. | |
| 2019/0114643 A1 | 4/2019 | Dewitt et al. | |
| 2019/0272064 A1 | 9/2019 | Ghassabian | |
| 2020/0028690 A1 | 1/2020 | Barakat et al. | |
| 2020/0045003 A1 | 2/2020 | Fried | |
| 2020/0045004 A1 | 2/2020 | Fried | |
| 2020/0120097 A1* | 4/2020 | Amitay | G06Q 50/01 |
| 2021/0160206 A1 | 5/2021 | Fried | |
| 2021/0273897 A1 | 9/2021 | Fried | |
| 2023/0362299 A1 | 11/2023 | Ranalli | |

FOREIGN PATENT DOCUMENTS

| | | |
|---|---|---|
| WO | 2005009015 A1 | 1/2005 |
| WO | 2010134972 A1 | 11/2010 |
| WO | 2012148011 A1 | 11/2012 |
| WO | 2015142601 A1 | 9/2015 |
| WO | 2016126355 A1 | 8/2016 |
| WO | 2016154612 A1 | 9/2016 |
| WO | 2017212323 A1 | 12/2017 |

OTHER PUBLICATIONS https://9to5mac.com/2019/06/13/ios-13-messages-how-to-choose-profile-photo-and-display-name-for-imessage/ (Year: 2019).

Patent Cooperation Treaty, International Search Report and Written Opinion of International Application No. PCT/US2016/018407, dated Jun. 10, 2016, 10 pages.

Patent Cooperation Treaty, International Search Report and Written Opinion of International Application No. PCT/US19/43890, dated Dec. 9, 2019, 10 pages.

Patent Cooperation Treaty, International Search Report & Written Opinion for International Application No. PCT/US22/36839, mailed Oct. 4, 2022, 15 pages.

European Search Report for Serial No. 22850079.9; Mar. 28, 2025.

* cited by examiner

After setting up media content, Enterprise make the call (manually or automatically) to their customers Media content will be shown on customer phone when the call arrives (image, who is calling, telephone number, etc.

ENTERPRISE    CONSUMER'S PHONE

ENHANCED ENTERPRISE DATA COMMUNICATIONS WITH MOBILE DEVICES

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to communication systems and, more particularly, to mobile and enterprise telecommunications systems with enhanced outbound communications. dialing and notifications.

2. Related Art

Modern commercial enterprises rely on various communications modalities to reach customers and prospective customers for a wide range of business purposes. At the broadest level, businesses may rely on advertisement placements in mass media such as broadcast or cable television, radio, billboards, and the like. On a slightly narrower basis, more targeted advertisements in printed media such as magazines and newspapers that cater to a specific readership profile or demographic may be used to offer new products and services to a receptive customer base. More direct forms of promoting goods and services include direct mail, where printed materials are sent to pre-selected customers meeting geographic, demographic, or other categories via postal service. Direct mail has also been extended to other communications modalities in which prospective customers may reached on an individual basis, such as telephone (referred to as telemarketing), e-mail, mobile or SMS (short message service or text), MMS (multimedia message service), and push notifications generated through device-installed applications.

In order to reach the maximum number of prospective customers, various technological measures may be employed. In the context of telemarketing, automated dialers sequentially dial a massive list of telephone numbers, which may then play back a recorded message and/or connect the call to a live operator once a call has been established with the recipient. Similar devices may be utilized for sending text/multimedia messages through mobile communications networks. Mass e-mail transmissions may be as simple as executing a pre-programmed script on an Internet-connected computer system to transmit a pre-written message to a selection of e-mail addresses.

Due to the invasive and oftentimes fraudulent nature of unsolicited telephone calls, text messages, and e-mails, both technological countermeasures and legal restrictions have been devised to curb the abuses. For instance, most e-mail services and applications include spam filters that remove many unsolicited commercial e-mails before reaching a user's inbox. In the United States, federal legislation such as the CAN-SPAM (Controlling the Assault of Non-Solicited Pornography and Marketing) Act prohibits senders of unsolicited e-mails from sending messages with false headers, require unsubscribe options, and so on.

There are similar legal restrictions on unsolicited telephone calls such as the National Do Not Call Registry that prohibits sales calls to those on the registry. On the technical side, mobile carriers as well as smartphone application developers have implemented call and text message filters that hide or quarantine incoming communications that have been automatically determined to be undesirable. To a certain extent, telephone/mobile phone users have relied upon caller ID to screen the identity of incoming callers before deciding to accept or decline it. Notwithstanding these technical and legal efforts to curb unwanted calls, robocalls have continue unabated, with many calls getting through because of various technical means that are available to spoof the caller ID number for calls originating from Voice Over IP (VoIP) system. To this end, carriers have begun implementing STIR/SHAKEN (Secure Telephony Identity Revisited/Signature-based Handling of Asserted information using toKENs), which provides information about the caller to the recipient and validates the identity through attestation procedures performed by intermediary carriers.

A business may have a variety of reasons for initiating telephony interactions to customers beyond the aforementioned sales and marketing contexts, such as customer support purposes across multiple business domains. Yet, nearly 80% of originated calls are known to be ignored by the recipients. While calls appropriately validated by supplying truthful caller identification information has been found to double answer rates, this is dependent on the quality and relation of the business to the consumer. It would be desirable to extend these interactions beyond just an incoming telephone call, and to immediately precede these calls with additional information so that the customer/call recipient may not only ascertain and validate the identity of the caller before answering, but also be provided with the purpose or other contextual information regarding the call. Accordingly, there is a need in the art for a mobile and enterprise telecommunications systems with enhanced personalized outbound dialing and notifications.

BRIEF SUMMARY

The present disclosure is directed to various systems and methods for enhanced outbound communications, including dialing, calling, and presenting notifications. In particular, one embodiment is a system for establishing a communications session between an originator node and a recipient node over an originating network and a terminating network. The system may include an originating network interface that is connectible to the originating network. The originating network interface may also be receptive to a media content request from the originating network, and the media content request may be associated with an originator node communications session request to the originating network. The system may further include a database that stores one or more originator node records, each of which may be defined at least by an originator node identity, a network node address, and a media content element. There may also be a communications session processor that is connected to the incoming communications session network interface and the database. The communications session processor may retrieve the media content element associated with the originator node record from the database. The originator node record may correspond to the originator node communications session request that is received by the incoming communications session network interface. The system may also include a terminating network interface that is connectible to the terminating network. The media content element retrieved by the communications session processor may be transmitted on to the terminating network and destined for the recipient node through the terminating network interface.

According to one embodiment, the method may be specifically directed to establishing a communication session from an originator node on an originating carrier network to a recipient node on a terminating carrier network. The method may include receiving a communication initiation request from the originating carrier network. The communication initiation request may correspond to a telecommunication session initiated on the originator carrier network by the originator node to the recipient node. The originator node may provide an asserted originator node identifier to the originating carrier network at the initiation of the telecommunication session. The method may also include validating an identity of the originator node against a pre-stored certificate retrieved from a database against the asserted originator node identifier provided by the originator node. This may be done in response to receipt of the communications initiation request. There may also be a step of retrieving media content pre-associated with the originator node on the database. The method may also include transmitting the media content to the terminating carrier network for relaying the media content to the recipient node in conjunction with establishing a connection of the originating carrier network to the recipient node through the terminating carrier network. The communication session may be established between the originator node and the recipient node over the connected originating and terminating carrier networks. Certain embodiments may be directed to non-transitory program storage media on which instructions corresponding to these operations are stored, and are executable by a processor or programmable circuit.

The present disclosure contemplates various systems, methods, and apparatuses for overcoming the above drawbacks accompanying the related art.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of systems, methods, and apparatuses for mobile and enterprise telecommunications with enhanced outbound dialing and notifications. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
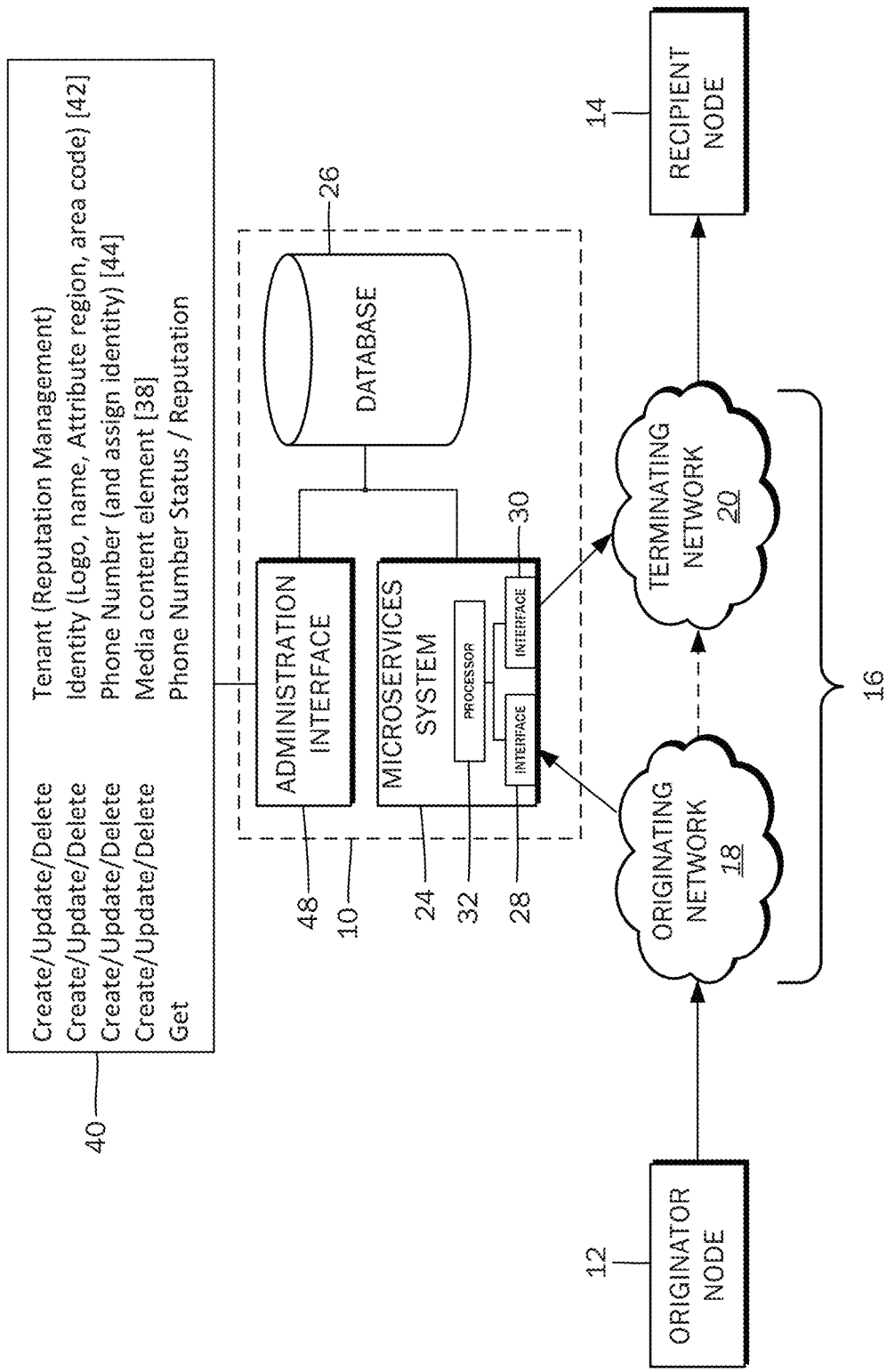
FIG. 1 is a block diagram illustrating one embodiment of a system for establishing a communications session between an originator node and a recipient node over an originating network and a terminating network.

The block diagram of FIG. 1 illustrates one embodiment of a system 10 in accordance with the present disclosure. The system 10 establishes a communications session between an originator node 12 and a recipient node 14 over a communications network 16. In the illustrated embodiment, the communications network 16 may be a public switched telephone network operated by one or more national, regional, or local carriers. In this regard, the originator node 12 and the recipient node 14 are telephones or other devices that compatibly operate in accordance with various telephony standards to connect to the communications network 16. Some portions of the communications network 16 may be carried over the Internet, such as Voice over IP (VoIP) networks.

The originator node 12 connects to an originating network 18, while the recipient node 14 connects to a terminating network 20. There may be one or more intermediary or peering network links 22 between the originating network 18 and the terminating network 20, though this is by way of example only and not of limitation. It will be recognized that the entirety of the communications network 16 may be operated by a single carrier. The specific reference to the originating network 18 and the terminating network 20 is only to distinguish between the respective connection of the originator node 12 and the recipient node 14 to the broader communications network 16. Along these lines, while the illustrated example refers to a public switched telephone network, it will be appreciated that any other communications modality may be substituted without departing from the scope of the present disclosure.

In an exemplary embodiment, the entity operating the originator node 12 may be operated by a business/enterprise that is attempting to call a customer that is the recipient node 14. Thus, the originator node 12 may be a desktop phone device, a general-purpose computer that is loaded with a softphone application, or other like device that connects to the originating network 18. The recipient node 14, on the other hand, may be a mobile device such as a smartphone that can make and receive telephone calls over the PSTN (of which the cellular network is a part), as well as present a range of content including text, images, video, and audio. The mobile networks to which smartphones can connect provide data services, so instead of directly receiving phone calls, there may be VoIP applications that serve as endpoints therefor and carry telephone calls over the IP data network. Again, the identity and equipment type of the originator node 12 and the recipient node are presented by way of example only to distinguish one entity from another in a typical call sequence. The embodiments of the present disclosure are therefore not limited to any particular entity type or end user equipment, whether connected to the overall communications network 16 directly connecting the originator node 12 to the recipient node 14, or external thereto.

The system 10 includes a microservices system 24 that cooperates with the originating network 18 and the terminating network 20. As will be described below, various data elements utilized for the operation of the system 10, and specifically the microservices system 24, may be stored in a database 26. The microservices system 24 is understood to be a server computer system, or multiple server computer systems configured as a single cluster that is connected to the communications network 16 to receive and respond to requests from an external node. The microservices system 24 therefore includes an originating network interface 28 that is connectible to the originating network 18, and is receptive to, among other things, a media content request from the originating network 18. The microservices system 24 also includes a terminating network interface 30 that is connectible to the terminating network 20 to transmit data thereto. The originating network interface 28 and the terminating network interface 30 may be implemented in various ways, though as a general matter, are understood to incorporate data reception/transmission and control interfaces that are compatible with the respective originating network 18 and terminating network 20.

The instructions received by the originating network interface is provided to a communications session processor 32, which then evaluates the incoming command using data that may be stored in the database 26. However, this evaluation may also be completed with data retrieved via other modalities, including that which an artificial intelligence system can retrieve from other sources based on the instructions. In accordance with one embodiment of the present disclosure, the command from the originating network 18 is to retrieve and transmit media content that is associated with the originator node 12 to the recipient node 14 in conjunction with the placement of the call. Accordingly, the originating network 18 is contemplated to generate a media content request based upon initiated call, which may be more generally referred to as a communications session request 34 that is issued to the originating network 18. As will be described in further detail below, it is possible to generate a media content request independently of the initiated call and transmit the same via out-of-band modalities. The originating network 18 thereafter forwards such portion of the request, e.g., the media content request 36, to the originating network interface 28.

Based upon the media content request 36, the communications session processor 32 may retrieve a media content element 38 that is stored in the database 26. It is contemplated that the system 10 provides the media content element 38 to the recipient node 14 that is specifically associated with or designated by the originator node 12. Thus, in such embodiments, an association is defined between the identity of the originator node as and the media content element 38. The database 26 is understood to include records 40 of the identity 42 of various originator nodes, and may be defined by various fields including the name, area code, the region, and logo associated with the entity. This record 40 may also include phone number information 44, which may be more generally referred to as a network node address. In some embodiments, the communications session processor 32 may validate the media content request 36 to ensure that the originator node 12 from which it is made is not attempting to present false caller identifiers in an effort to circumvent fraud and other unwanted call detection, and so forth. Thus, in addition to the media content element 38, the identity 42, and the phone number information 44, the records 40 may also include a phone number status/reputation field 46.

The communications session processor 32 may validate the originator node 12 utilizing the record 40 associated with information provided via the media content request 36, and retrieve the media content element 38 that corresponds to the provided identity. The communications session processor 32 may relay the media content element 38 to the terminating network interface 30 for transmission to the terminating network 20. The terminating network 20 and the originating network 18 may also negotiate the establishment of the connection based upon some validation of the originator node 12. This procedure may involve the validation of certificates, and other known methodologies that can be implemented on the mobile device as add-on applications and the like to verify the identity of the originator node 12. Once validated, the terminating network 20 establishes the intermediary link 22 between the two, and the terminating network 20 permits the call to connect to the recipient node 14. The terminating network 20, cooperating with the microservices system 24, may deliver the selected media content element 38 to the recipient node 14 prior to connecting the call, as will be described in further detail below.

The media content element 38 that is relayed to the recipient node 14 may be varied according to what the originator node 12 designates. The operator of the originator node 12 may thus edit the media content element 38 via an administration interface 48 that is connectible to the database 26. In one embodiment, the administration interface 48 may be accessible via a web browser, and as such, be implemented as a web server computer system.

Figure 2:
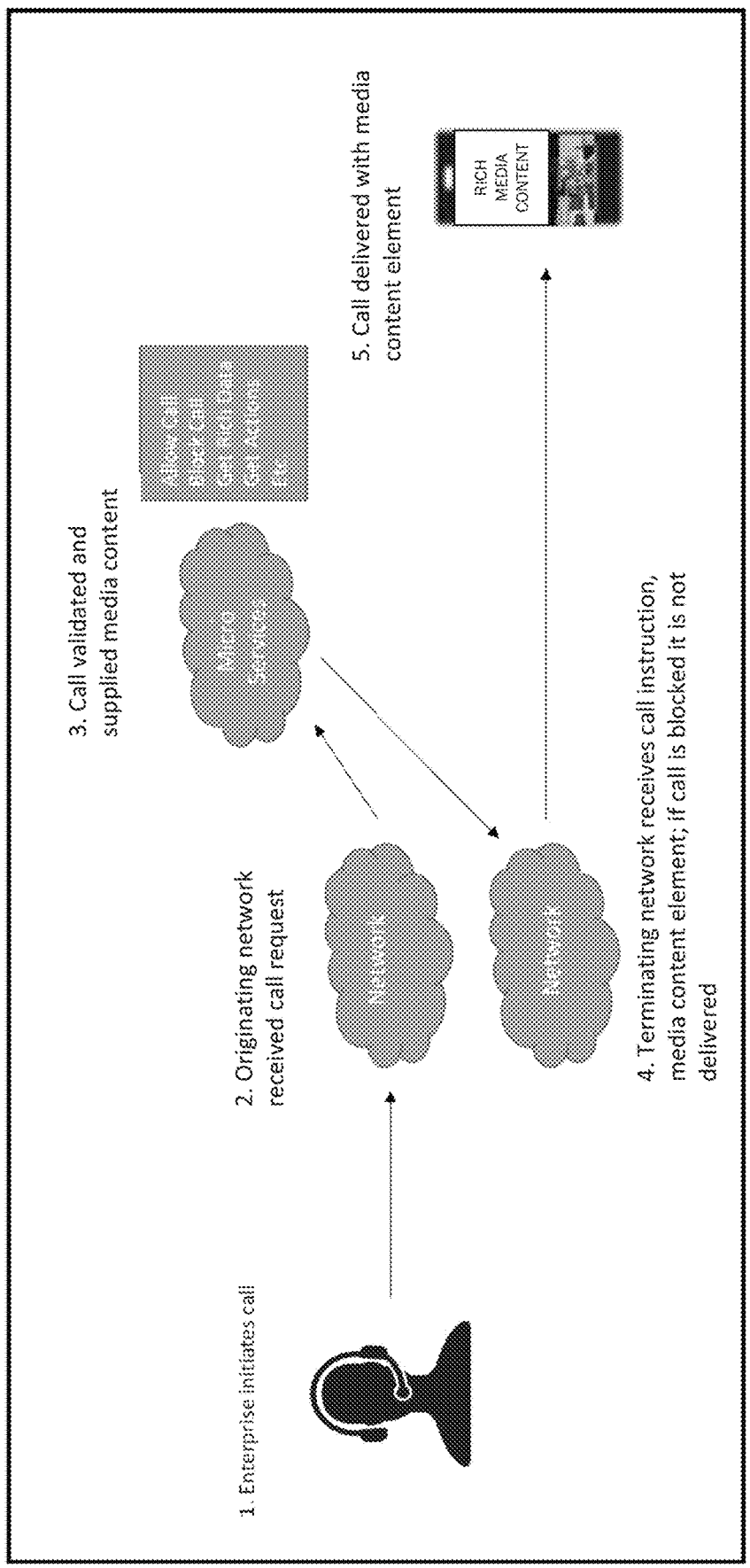
FIG. 2 is a diagram illustrating the sequence of actions taking place in the system according to one embodiment of the present disclosure.

Referring now to the diagram of FIG. 2, one operational flow according to an embodiment of the present disclosure begins with a step 1 of the enterprise initiating a call. This is understood to correspond to the originator node 12 and the communications session request 34 provided to the originating network 18. Thereafter, in a step 2, the originating network 18 receives the call, and the call is validated in a step 3 according to the modalities discussed above. The call may be allowed, blocked, further media content elements 38 may be provided, or further actions may be performed in a step 3. The terminating network 20 then receives the call instruction as well as any designated media content data element. If the terminating network 20 recognizes that the call has been blocked, the call and the associated media content element 38 is not delivered. Otherwise, the call and the designated media content element 38 is delivered to the recipient node 14, e.g., the mobile device or smartphone in a step 5.

Figure 3:
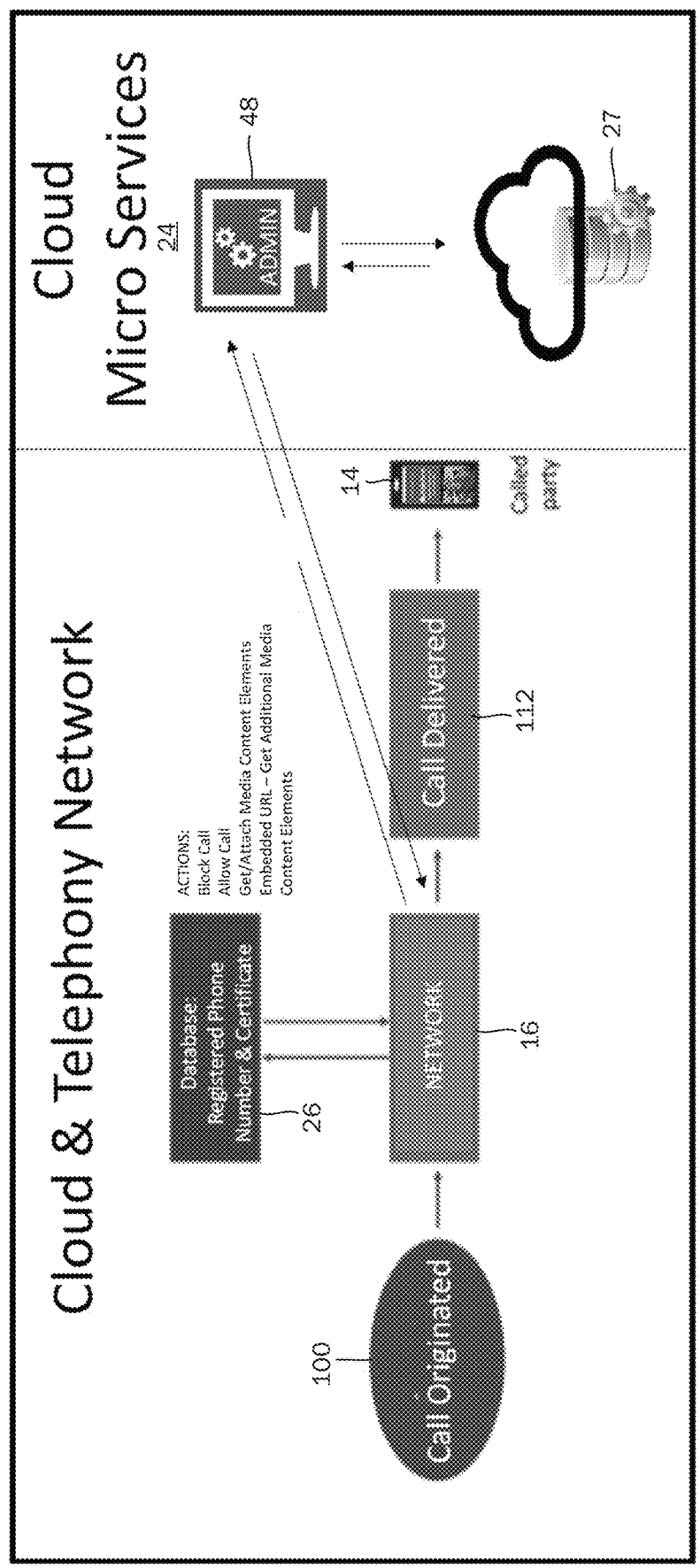
FIG. 3 is a diagram illustrating the sequence of actions taking place in the system to connect a call to a recipient according to an embodiment of the present disclosure.
Figure 4:
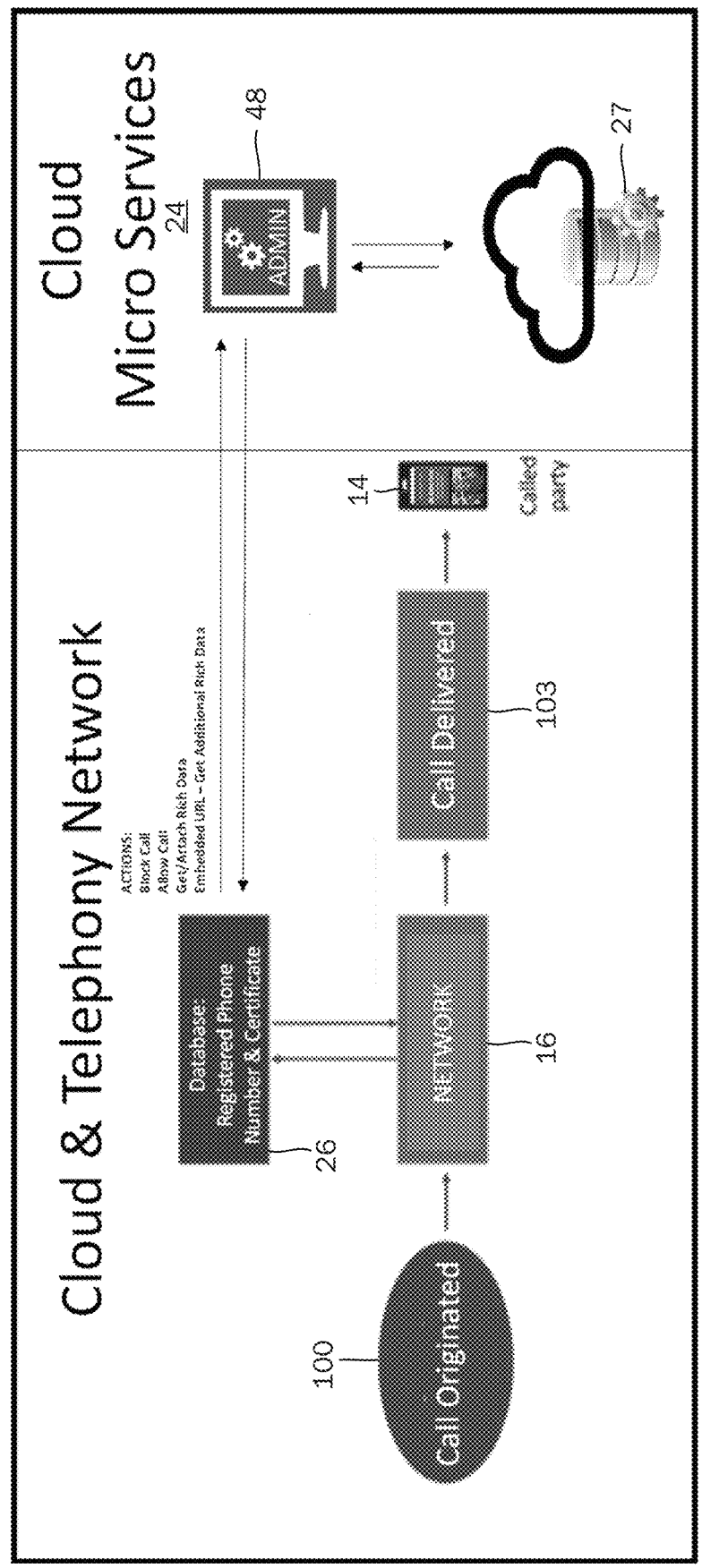
FIG. 4 is a diagram illustrating another sequence of actions taking place in the system to connect a call to a recipient according to an embodiment of the present disclosure.

The block diagram of FIGS. 3 and 4 illustrate the sequence of steps that take place in the system to connect a call to a recipient, with varying implementations. The two share some commonalities, beginning with the origination of the call according to block 100 on the communications network 16 or carrier. In the embodiment illustrated in FIG. 3, the systems of the communications network 16 cooperate with the database 26, which, as described above, stores a registered phone number as well as a certificate. This database and the information stored thereby can be the basis for blocking a call, allowing a call, retrieving and attaching media content data elements, or embedding a uniform resource locator with which additional media content data elements can be retrieved.

In the embodiment of the system 10 shown in FIG. 3, the database 26 may be logically and/or organizationally separate from the microservices system 24. The communications network 16 connects to the administration interface 48, which in turn retrieves the requested media content data from a separate database 27. The media content data, together with the phone call, may be delivered to the recipient node 14 or called party according to a step 102.

In the embodiment of the system shown in FIG. 4, the database 26 may likewise be logically and/or organizationally separate from the microservices system 24, but instead of the communications network 16 directly connecting to the administration interface 48, the database 26 does. The database 26 connects to the microservices system 24 and the administration interface 48 thereof, which in turn retrieves the media content data from the database 27. The database 26 in turn relays the requested media content data to the communications network 16. Similar to the first embodiment, the media content data and the phone call may be delivered to the recipient node 14 in a step 103.

Figure 5:
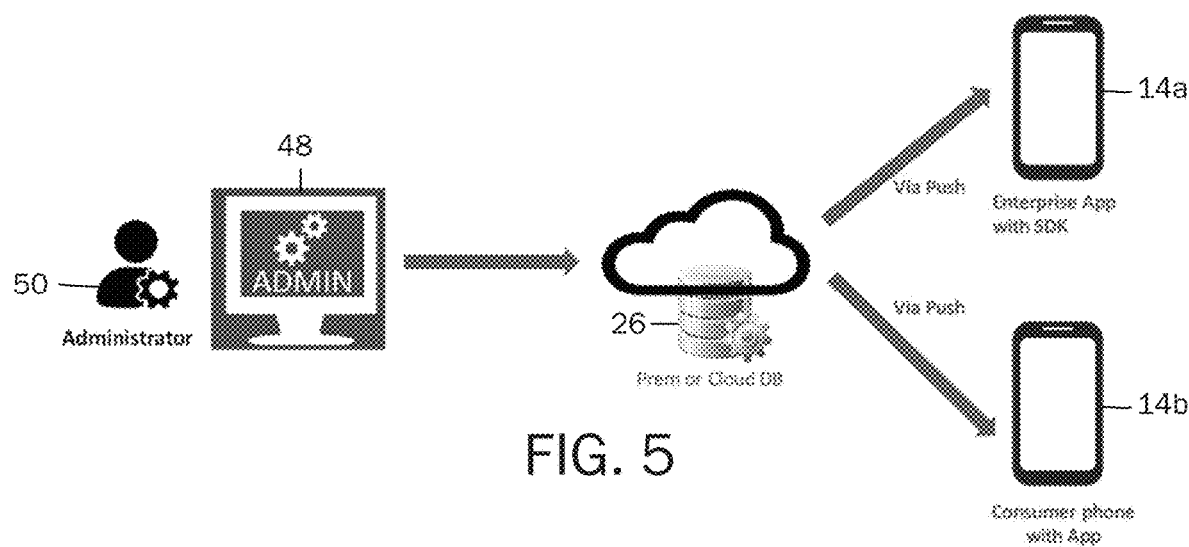
FIG. 5 is a block diagram illustrating an operational flow of an embodiment of the present disclosure in which content notification is delivered via a mobile application or an enterprise application.

The block diagram of FIG. 5 depicts another possible use case for the system 10 where media content is delivered to the recipient node 14 without any interactivity with the user thereof. The administrator 50, possibly using the administration interface 48 of the system 10, sets the media content to be transmitted, and stores the same on the database 26. The database 26 may be an on-premises server computer system, or a remote or cloud-based system. In one case, the recipient node 14a is an enterprise application that is written as a custom software solution based on a software development kit (SDK). The SDK may be incorporated into a dedicated enterprise application that may be distributed to the recipient node 14 according to conventional modalities. For example, a bank may have a dedicated application that customers may use to perform various transactions therewith. Such an application may incorporate the additional functions of the features described herein, and communicate with the system 10 to do so. In another case, the recipient node 14b is a consumer mobile device on which a dedicated app has been installed. Furthermore, the functionality may be implemented in the mobile device operating system, or in a pre-installed application that is shipped with the mobile device. Either the SDK or the dedicated app is configured to communicate with the database 26 via a push-oriented system, where the database 26 originates the transmission of data without a precursor request from the recipient nodes 14.

Figure 6A:
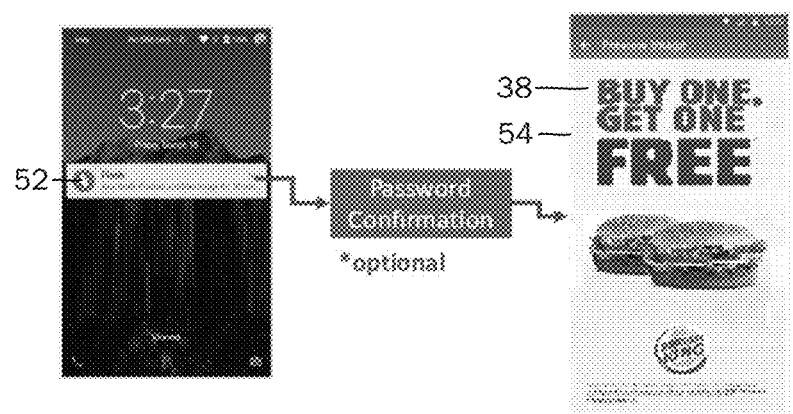
FIG. 6A is a sequence of screenshots showing the user interface of a mobile application according to an embodiment of the present disclosure.
Figure 6B:
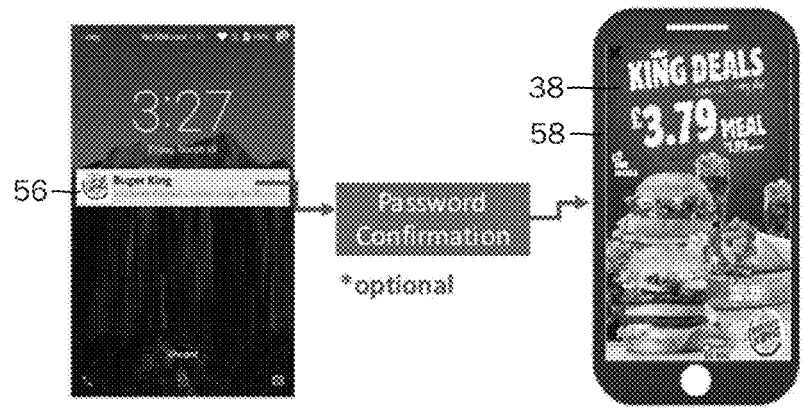
FIG. 6B is a sequence of screenshots showing the user interface of an enterprise application according to an embodiment of the present disclosure.

With reference to the example screenshot of FIG. 6A, once the push transmission of the data reaches the mobile device/recipient node 14, a notification pop-up 52 may be generated, identifying the dedicated app as the source of the notification. A password prompt may optionally be presented. Upon verification of the password, within the graphical interface 54 of the dedicated app, the pushed media content elements 38 may be displayed. The example screenshot of FIG. 6B illustrates a similar procedure except in the context of a custom enterprise application. Again, once the push transmission of the data reaches the mobile device/recipient node 14, a similar pop-up 56 may be generated, except that the enterprise application is identified as the source of the notification. Similar to the consumer app implementation, a password prompt may be presented. Upon verification, the graphical interface 58 of the enterprise application can present the pushed media content element 38.

Either implementation further contemplates the possibility of the administrator 50 setting a time allotment to view the media content element 38, and beyond the expiration of such time limit, it is no longer available for viewing. The optional verification step may be used to redirect the user to a hidden viewing location, with a failed authentication (or non-authentication) resulting in a different media content element 38 being displayed. Those having ordinary skill in the art will recognize that there may be ways in which the mobile device operating system can be prevented from allowing the saving and/or screenshotting of the presented media content 38.

Along these lines, it is possible for the administrator 50 to configure the system 10 to deliver media content elements 38 that differs from location to location. For example, one promotional campaign that is being employed in one geographical region (e.g., the American Southeast) may be different from another promotional campaign for a different geographical region (e.g., the American West). The specific region to which the media content elements 38 are delivered may be evaluated based upon area code, location data associated with the specific mobile device, carrier data, carrier/tower data as reported from the mobile device, and any other identifier that may be collected from the mobile device.

The specific media content element 38 that is delivered or presented to the recipient node 14 may be varied according to the identity of the originating node 12, and the options to define such alternatives may be set and defined by the administrator 50. For example, different divisions of a business (customer service, sales, etc.) may originate calls with a self-identification as the business generally. However, a different media content element 38 may be associated with customer service than with sales, and various embodiments of the present disclosure contemplate the administrator being able to tailor or personalize the media content element 38 depending on such sub-identity and distinguishable phone numbers or other network node identifiers.

The administrator 50 may also define the number of times an outgoing call is attempted for a given presentation of the media content element. Moreover, the administrator 50 may define the number of times the presentation of the special media content element 38 is made, and upon reaching this threshold, subsequent presentations may return to a default media content element 38.

According to various embodiments of the present disclosure, sending the media content 38 concurrently to the recipient of an initiated call, is contemplated to substantially increase engagement. As utilized herein, media content 38 refers to any data or information that is presentable to the user of the recipient node. This is understood to include static images, video (with or without audio), text, as well as interactive content. The media content 38 may occupy the entirety the mobile device screen real estate, though partial screens are also possible and may be more appropriate in certain circumstances. The present disclosure contemplates the media content 38 being personalized for each recipient.

Figure 7B:
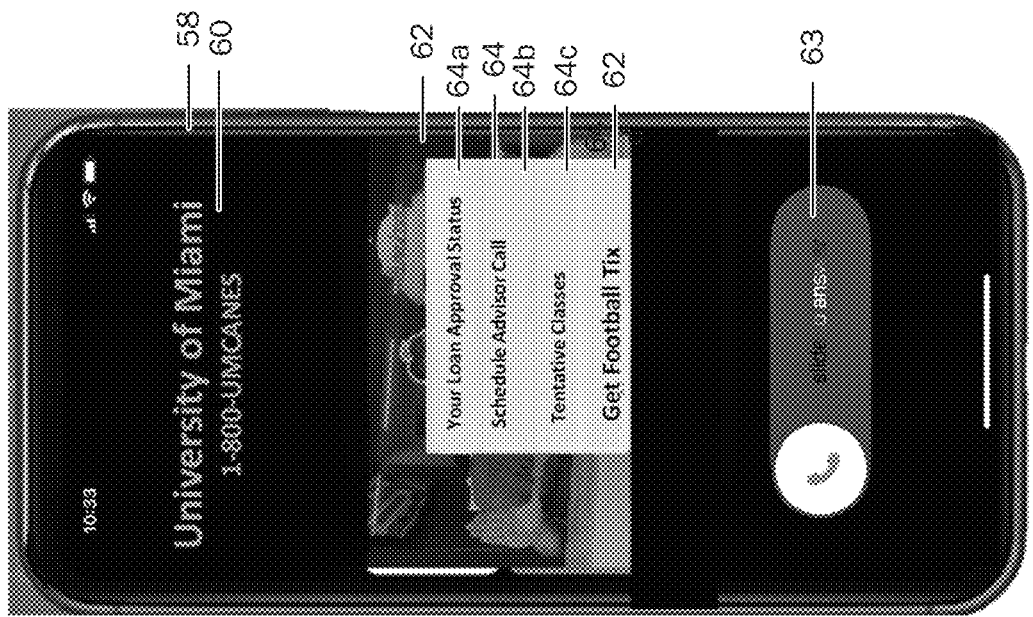
FIGS. 7A and 7B are screen shots showing an example implementation of incoming call screens in which further interactive elements are presented to the call recipient.
Figure 7A:
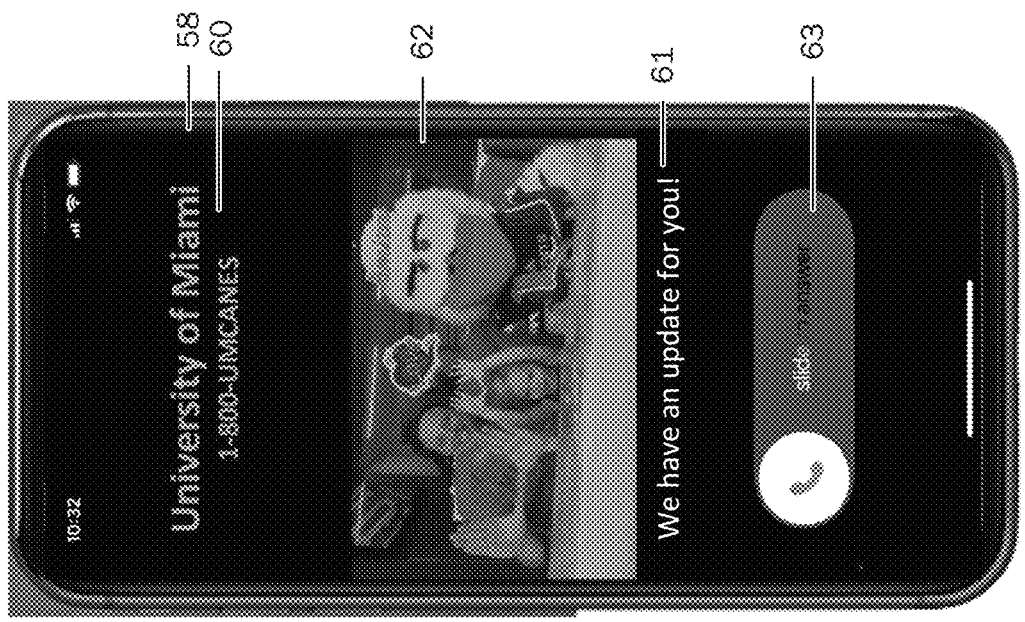

FIG. 7A illustrates another example graphical user interface (GUI) 58 that is displaying the media content 38 that is specifically associated with the caller, as the call arrives. In the example, the caller is identified as the "University of Miami," in a text area 60, together with the number of the caller, "1-800-UMCANES," as is conventional per CNAM telephony capabilities. The call originator may have designated additional text to be displayed that informs the user as to the reason for the call, which in the example shown in FIG. 7A, overlaid on the media content 38 as call reason text 61. This is only one example of many possible implementation of this feature. Additionally, the GUI 58 displays an image 62 that has been designated by the originator node 12 as the one to display concurrently with an incoming call. Per the standard call controller interface, a sliding switch element 63 may be overlaid on the image 62 with which the user can interact to accept the call. The media content 38, e.g., the image 62, may be delivered to the mobile device concurrently with the call, or delivered via out-of-band modalities.

FIG. 7B illustrates another kind of media content 38 that may be presented to the user as the call arrives. In this example, the same caller identifier "University of Miami" is displayed in the text area 60, as well as the telephone number of the caller, e.g., "1-800-UMCANES." As briefly noted above, it is also possible to incorporate interactive elements into the media content 38.

In addition to the image 62, there are a series of user-activatable buttons 64 that are overlaid thereon. Such interactive elements may be operative to generate commands or otherwise send data to a remote system that may further process the command/data to provide further options in the event the incoming call is refused. Alternatively, the command or data that is provided via the interactive elements provide a richer user experience to the user upon connecting the appropriate operator or providing the operator with more information, who can then deliver a more customized user experience.

It is possible to implement the described functionality in the system 10, though it is not necessarily limited to the particular embodiments thereof disclosed herein. The example shown in FIG. 7B provides four options, though there may be additional or fewer options presented depending on the implementation specifics. Furthermore, other communications modalities may be offered as options for taking further actions, such as Short Message Service (SMS), messenger, and so on. The options that are presented may depend on the pre-stored profiles, past transactions, service records, and the like that may be remotely stored such as in, for example, the database 26. The options presented in the example of FIG. 7B include checking a student loan approval status (via button 64a), scheduling a call with an academic advisor (via button 64b), reviewing a tentative list of classes (via button 64c), and purchasing football game tickets (via button 64d). The selection of an option may be operative to connect an operator and provide such operator with the user's desire to obtain information regarding a student loan, scheduling a telephonic meeting with an advisor, completing a purchase transaction, and so on. It may also be operative to redirect the user to a website, for example, to view the student loan approval, to view the open schedule of an academic advisor then adding a time block for a call, view available classes, or selecting and purchasing sporting event tickets. The specific list of options that are presented concurrently with the call may be based on past recorded profile data that identifies the user as an applicant for a student loan, as one who may require academic counseling, or one who has purchased football game tickets in the past. Because these commands are not understood to require further user engagement, they may be referred to as "one-touch" commands.

Figure 8B:
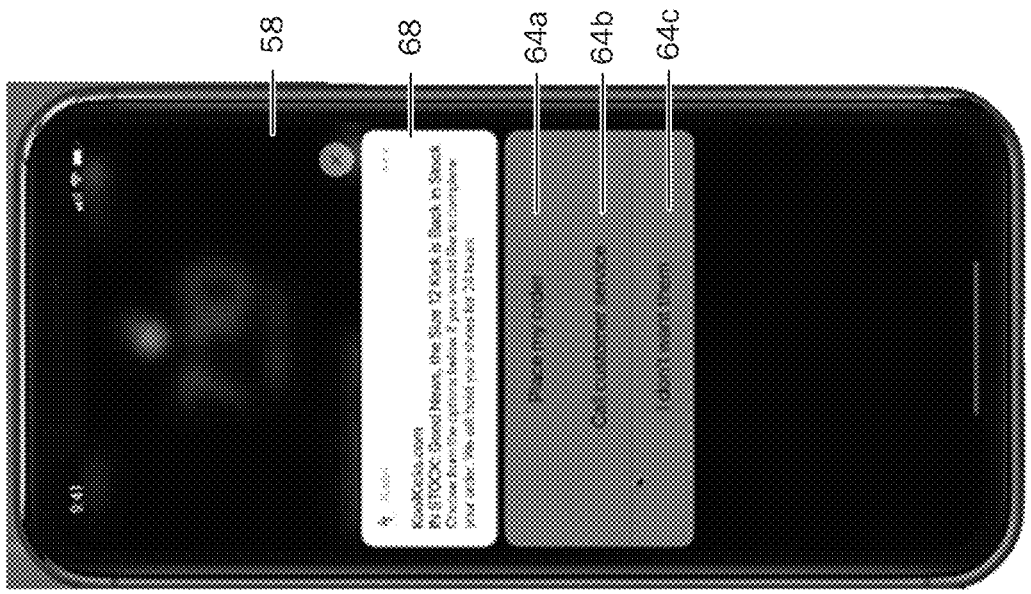
FIGS. 8A and 8B are screen shots showing a different example implementation of an incoming call screen where the user is presented with an option to inquire for additional information or to take additional action.
Figure 8A:
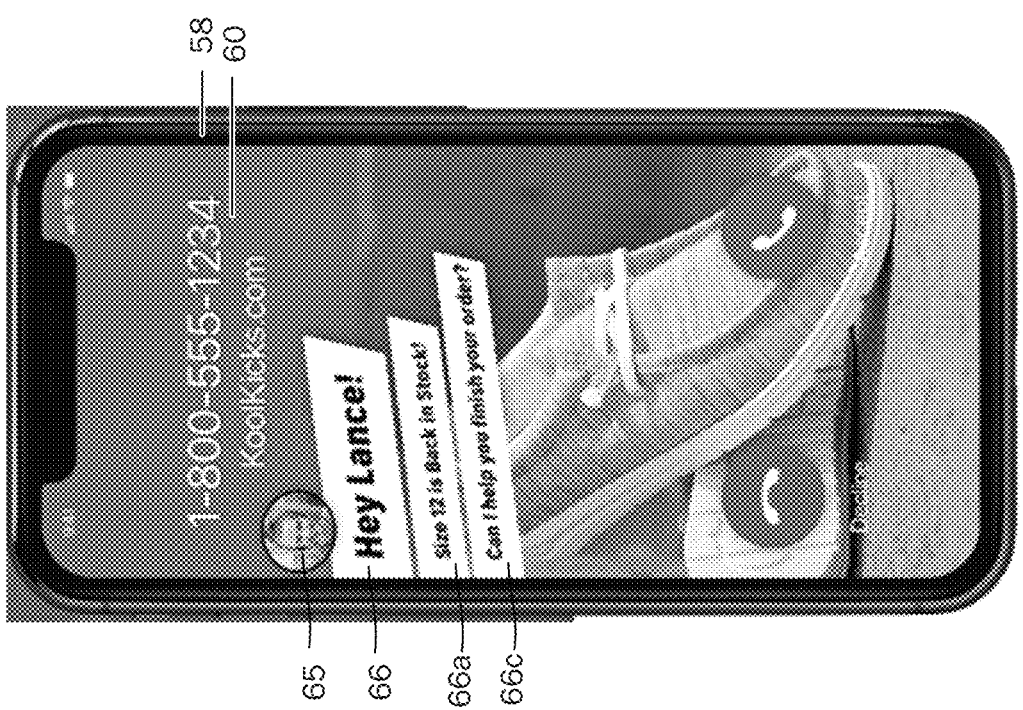

FIG. 8A depicts yet another form of media content 38 that provides additional context to the incoming call. The graphical user interface 58 again shows the identity of the caller (e.g., KoolKicks.com) and the phone number (e.g., 1-800-555-1234) in the text area. The background image may be contextually related to the identity and/or the purpose of the call, which in this example is the available of a pair of shoes of which the user may have a known preference in purchasing. There may additionally include a photograph or avatar 65 of the person calling from the business, and at the time of transferring such data, it may be stored in the local contact list of the mobile device such that subsequent calls from the same originator will show the same avatar. To the extent other operators from the same business may call, the system 10 may update the photograph/avatar 69 at the initiation of the call in accordance with another embodiment of the present disclosure. This is exemplary only, and other graphics may be presented, such as the logo of the business originating the call, and so forth. Further graphical elements 66 may address the user (e.g., "Lance") personally (66a), and identify the product of known interest, e.g., a size 12 of a particular model (66b), and a call to action (66c) that invites the call recipient to answer in order to complete the purchase transaction with the calling operator. The data used to populate this graphical content may originate from the remote database 26, and may be sent prior to or concurrently with the placement of the call by the originator node 12. The native call controller of the mobile device includes buttons to accept or reject the call.

FIG. 8B illustrates an alternative embodiment of the graphical user interface 58, in which a popup notification 68 is shown conveying the same information as to the availability of a shoe in a specific size. The user may be presented with multiple options, via a first button 64a that can be activated to complete the purchase/place an order, a second button 64b that can be activated to make a call to a customer service representative, and a third button 64*c* to indicate to the caller/originating node 12 that the user is no longer interested in the item. Pressing this button may be operative to generate a further command to the database 26 to remove the item from a list of watched products, so that no further inquiries to the user regarding such item will be originated.

As can be understood from the foregoing examples, the mobile device receiving the phone call shows a variety of permutations of pictures, brands, and profile information to the user. Accordingly, it is envisioned that the call recipient/user is more likely to engage with the call than such individual would have otherwise without receiving such content. For one, the recipient is informed of the specific party with whom the recipient has a history and/or interest in receiving the call. Furthermore, the recipient has the option not to answer the call, but still engage with the business to a certain extent via the aforementioned one-touch commands that accompanied the incoming call. Several examples of these command were shown and described above, but may generally include those that maintain the current purchase intent without any changes, make anticipated updates or changes to customer intent or status without requiring the user to enter a separate session, or one-click links with pre-configured changes to the call recipient's account in a separate session. These additional options are contemplated to improve the customer or user experience, and provide much greater response rates, higher customer resolution rates, and customer engagements while reducing costs of business compared to more conventional communication modalities. From the perspective of the user, these are contemplated to be simple, one-click/one-tap actions, but as has been described herein, there are several automated processes that occur without intervention on the part of the user.

Figure 9:
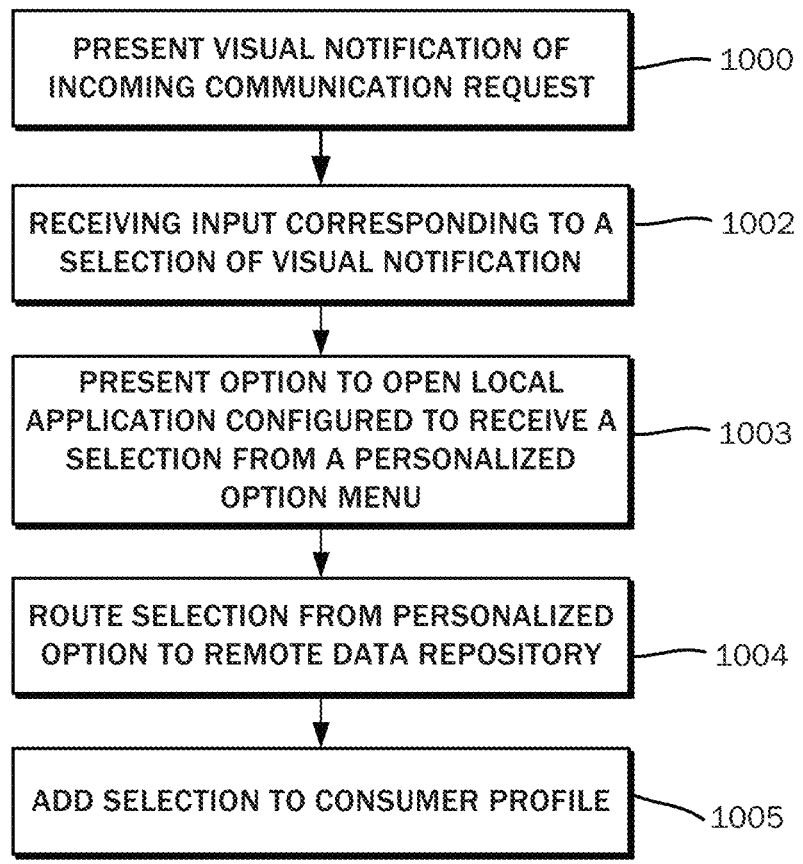
FIG. 9 is a flowchart that shows the steps of a method for enhanced consumer experiences according to one embodiment of the present disclosure.
Figure 10:
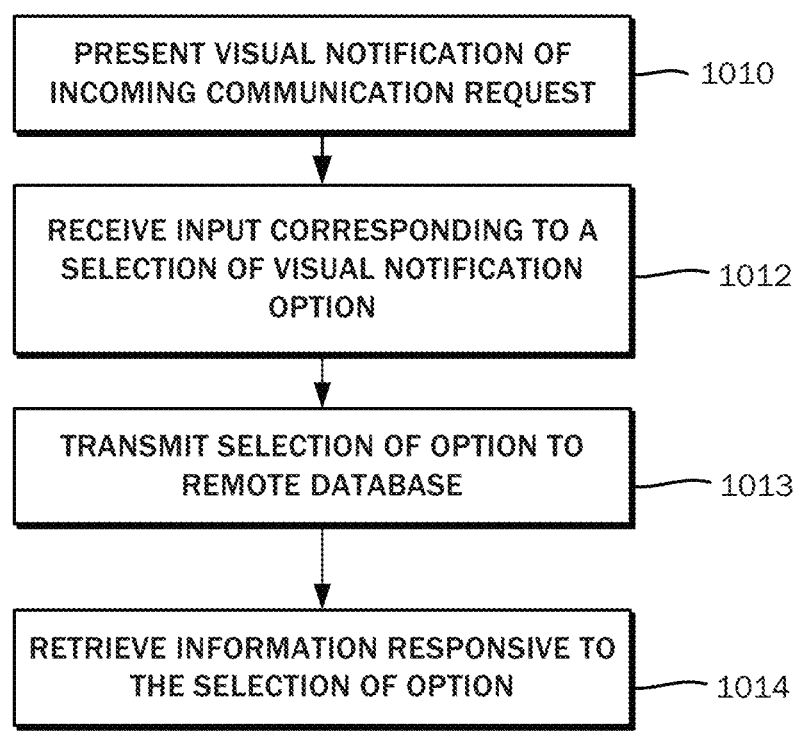
FIG. 10 is a flowchart of another method for enhanced consumer experiences.

The flowchart of FIG. 9 illustrates a method for establishing a communications session between an originator and a recipient that corresponds to the foregoing example. This method is contemplated to enhance consumer care and facilitate sales experiences, and at least a portion of such method may be performed by a computing device including at least one processor. The method may begin with a step 1000 on the mobile device of the user where a visual notification of an incoming communication request is displayed. The incoming communication may be a text message, phone call, instant message, or any other real-time data that originates from an external node destined for the user device.

Then, there is a step 1002 of receiving a user input that corresponds to a selection of the personalized visual notification. If the visual notification is selected and the user desires to continue engagement, an option is presented to open a local application that is installed on the mobile device in accordance with a step 1003. Such application is understood to be configured to receive a selection from a personalized option menu. Once the application is invoked and one of the options to take a further action is selected, the method continues with a step 1004 of routing the selection to a remote data repository. The remote data repository may be utilized to track the user's selection of an option from the personalized option menu. Thereafter, the mobile device may add an identification of the selected action to a consumer profile.

The visual notification may be associated with multiple options, and the mobile device may receive an input that indicates a selection of at least one of the options. The mobile device adds customer information or option responses that are based on the options selected. It is possible for the mobile device to open the local application without further user intervention, and may offer additional options with one-touch options to complete modifications to any element of the stored data pertaining to the customer. These include one-touch purchases, account changes, renewals, and the like.

Another embodiment of the present disclosure is directed a method for presenting an electronic visual, from which one or more displayed options can be selected. This method begins with a step 1010 of presenting a visual notification of an incoming communication request. This is similar to the embodiment of the method discussed above, except that in addition, one or more selectable options are also displayed. The input corresponding to a selection of one of these options takes place in a step 1012. In a step 1013, the data relating to the selection can be transmitted to a remote database which tracks that the electronic visual was selected. On the device, it may be determined that the electronic visual is associated with either consumer-specific information, or broader information pertaining to other subjects. In either case, the device may retrieve the information that is responsive to the selection in a step 1014, then display the same.

Along these lines, the embodiments of the present disclosure further contemplate a method for generating and/or modifying an electronic visual. On the mobile device, there is a step of receiving an input that indicates a selection of an option from one or more options or lists that are available for display on the mobile device. In response to receiving the input, the mobile device may create and save tracking data associated with the user's selection of that option. Additionally, the mobile device may also retrieve and present the same tracking data. A data object may represent a specific service inquiry, such as the name, images, customer number, customer identifiers, and internal identifiers to be saved to a user's profile or customer relationship management record. The mobile device may present a user-focused display that includes one or more options directed to a consumer that is based on information which is learned, known, or estimated about the consumer, or directed to the consumer. This information is contemplated to be used to better service the consumer.

Figure 11:
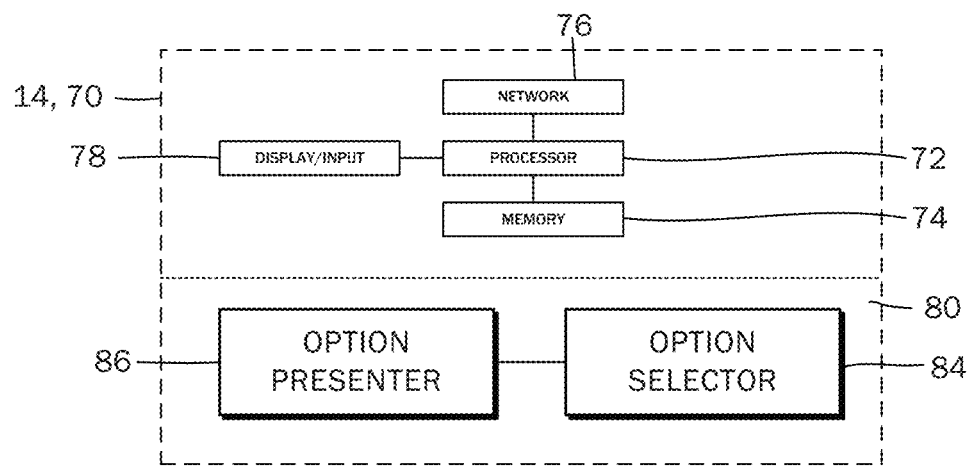
FIG. 11 is a block diagram of one implementation of a system for generating a visual list displayed on a mobile device.

The block diagram of FIG. 11 illustrates additional details of an embodiment of the recipient node 14 in which the foregoing interactive call response features may be implemented. The recipient node 14 is understood to be a mobile communications device 70 such as a smart phone that incorporates a general-purpose data processor 72 and a memory 74 for storing various data as well as programmed instructions that are executed to implement various applications and functional modules. Additionally, the mobile communications device 70 is understood to have a network communications module 76 with various elements that enable bi-directional communications with a remote system. These may include the wireless baseband systems for WiFi, cellular networks, and the like, as well as those implementing TCP/IP networking, and so on. The details thereof are well known and so will not be described further. The mobile communications device 70 further incorporates a display device and an input device, which in most smartphones is a combination touch screen display 78. Graphical elements are shown on the display, while haptic inputs at locations along the screen corresponding to those areas in which the graphical elements are displayed being operative to manipulate or otherwise interact with the same.

The mobile device 70 may include an application 80 that is stored in the memory 74 and executed by the processor 72, that implements an option presenter 82 and an option selector 84 in accordance with another embodiment of the present disclosure. The option presenter 82 is contemplated to provide a product or service options for display on the touch screen display 78. The option selector may detect when an option has been selected for viewing. In response to such detecting that an option has been selected, one of two additional actions may be performed. One action is transmitting the data to a remote database that tracks the selection of the option by the user for subsequent use to present further relevant options in a later communications initiation. Another action is providing an option to open and supply information about the selection(s). There may be data object(s) that represents a specific service inquiry or potential revenue contract to purchase, including any one or more of name, images, customer number, custom identifiers, and internal identifiers and content to be saved to a user's CRM/profile, with such data objects being the basis by which customer information is recorded for subsequent processing and use.

In another embodiment of the present disclosure, there may be a method for generating and modifying a displayed list on a mobile device. A service option list to a consumer or business customer may be displayed, and the associated data can be provided to the mobile device when the user selects the option. The option to open a separate application may be presented. A data object that represents a specific service inquiry is used to share the data, and may additionally include the name of the customer, associated images, customer number, other custom identifiers, unique contract metadata and identifiers, as well as internal identifiers and content that may be saved to the profile of the customer. Such profile may be stored in a customer relationship management (CRM) system.

The user's profile, account setting, or planned purchase may also be generated and/or modified. From the mobile device 70, the user may provide an input corresponding to a selection from a list of options that are presented thereon. In response to the input, a data stream may be created and saved. The data may include content that is to be saved in association with a user's inquiry and may be stored on the CRM system that tracks the selection of options by such user over time. Also in response to the input, the system may provide an option to open a separate application to retrieve the associated information. Again, the same data object discussed above, which includes one or more of the name, image, customer number, customer number, other custom identifiers, unique contract metadata and identifiers, as well as internal identifiers and content that may be saved to the profile of the customer or other data stores linked to another associated system.

Figure 12:
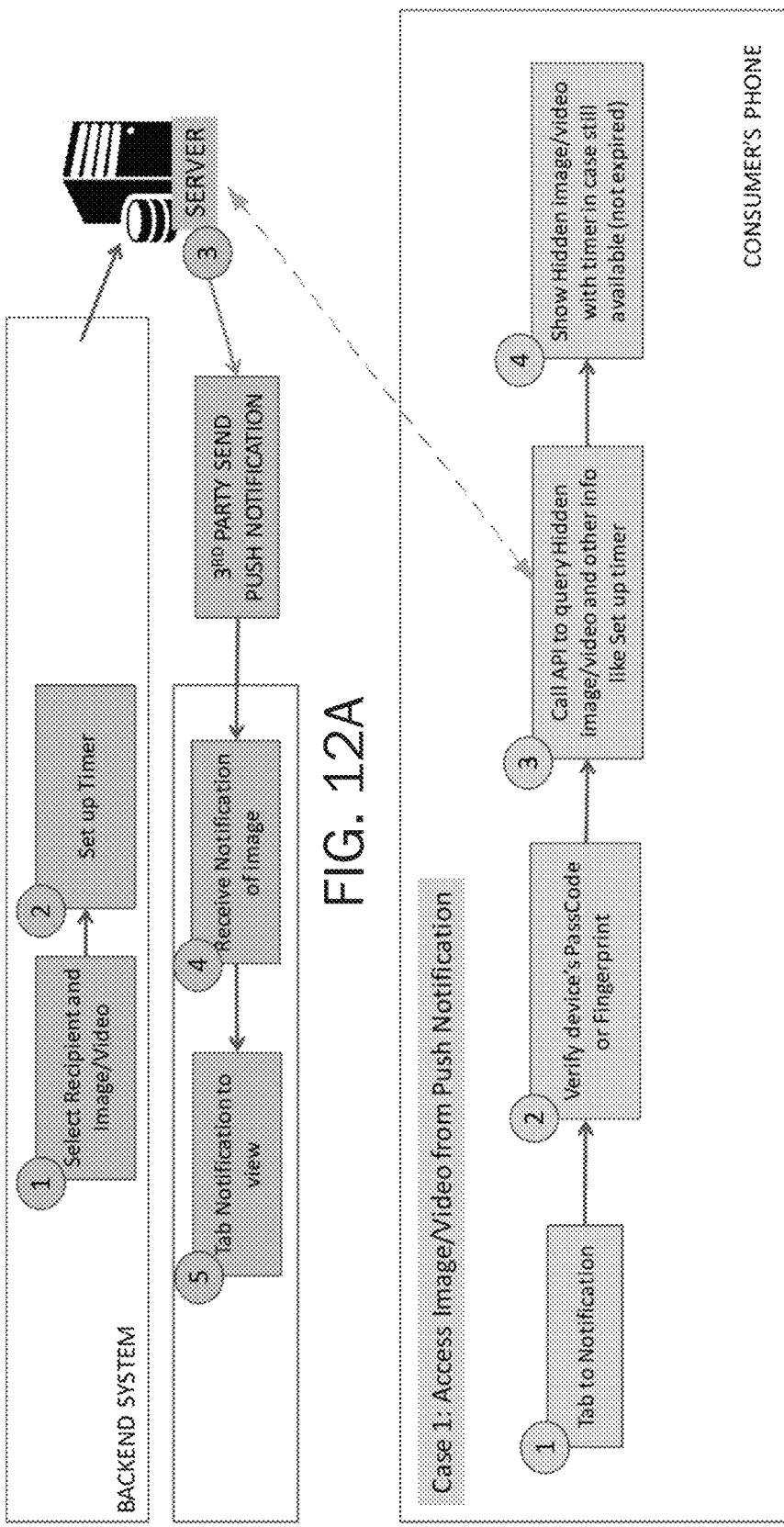
FIGS. 12A, 12B are diagrams showing the operational flow according to an embodiment of the present disclosure.

FIGS. 12A, 12B shows an example operational flow according to an embodiment of the present disclosure in relation to the system 10. The operational flow of may begin within the back-end system, where the enterprise sender selects a recipient and image (step 1). Selecting a recipient may be navigating a contact list that stores potential call recipients, and selecting the image/video (e.g., the media content element 38) may involve uploading the same to the system 10 from a predetermined source. The contact list may be that which is stored on a customer relationship management (CRM) system, or other like database, though it is not necessary that the data therefor be stored in any particular system or in any particular format. Once uploaded, the enterprise system may transmit the media content element 38 and the designated recipients to the database 26. Again, as discussed above, it is possible for different media content elements 38 to be delivered to different recipients, though part of the same telemarketing/telesales/teleservice effort. After selecting the recipient and image (though any order of selecting the recipient, image, and time period is contemplated), the operational flow may continue with the user's setting a time period (step 2). The completed transmission, including the image and associated submission data indicative of the recipient and time period, is then uploaded to the system 10 (step 3), for example, using an API such as a standard server interface that supports data transfer over the Internet (e.g. JavaScript Object Notation or JSON).

The operational flow of FIG. 12A continues with the receipt, by the system 10, of the transmission. Upon receipt of the transmission, the system 10 may update the user interface associated with the recipient indicated by the transmission to make the image of the transmission available for display for the period of time designated by the transmission. The system 10 may, for example, update server-side data to be interpreted by the mobile application or the enterprise application installed on the recipient's mobile device. The system 10 may then send a push notification to the recipient's mobile device, the push notification indicating that the image is available for display for the period of time designated by the transmission. The recipient's mobile device may then display the push notification (step 4) where push notifications are displayed, or as a popup overlaying any screen of the mobile device. If time remains before the image expires, the recipient may view the image by launching the mobile application directly from the push notification or by navigating to the image from within the mobile application.

FIG. 12B shows another example operational flow according to an embodiment of the present disclosure in relation to the system 10. The operational flow of FIG. 12B may occur within the recipient's mobile device when the recipient wishes to view the image sent by the sender (i.e. the flashed image indicated in the push notification). The operational flow of may begin (step 1) with the recipient's interaction with the push notification. As described above, authentication of the user may be required (step 2), for example, by fingerprint using an authentication prompt and authentication success notification and/or by passcode using a password prompt and password entry tool. Following the successful authentication of the recipient of the sent image, the mobile device may query the system 10 for the image and associated time period as set in the sender's transmission (step 3), for example, using an API such as a standard server interface that supports data transfer over the Internet (e.g. JavaScript Object Notation or JSON). In the case of accessing the image directly from the push notification, for example, the query to the system 10 may include an ID of the push notification that links the push notification with the sender's submission request. In the case of accessing the image from a history screen, the query to the system 10 may locate any transmissions that were uploaded by the user whose history screen is being viewed and whose submission data indicates the recipient. Having located the correct transmission, the mobile application may then display the image to the recipient, along with a timer showing the remaining viewing time, provided the viewing time has not already expired (step 4).

Figure 13:
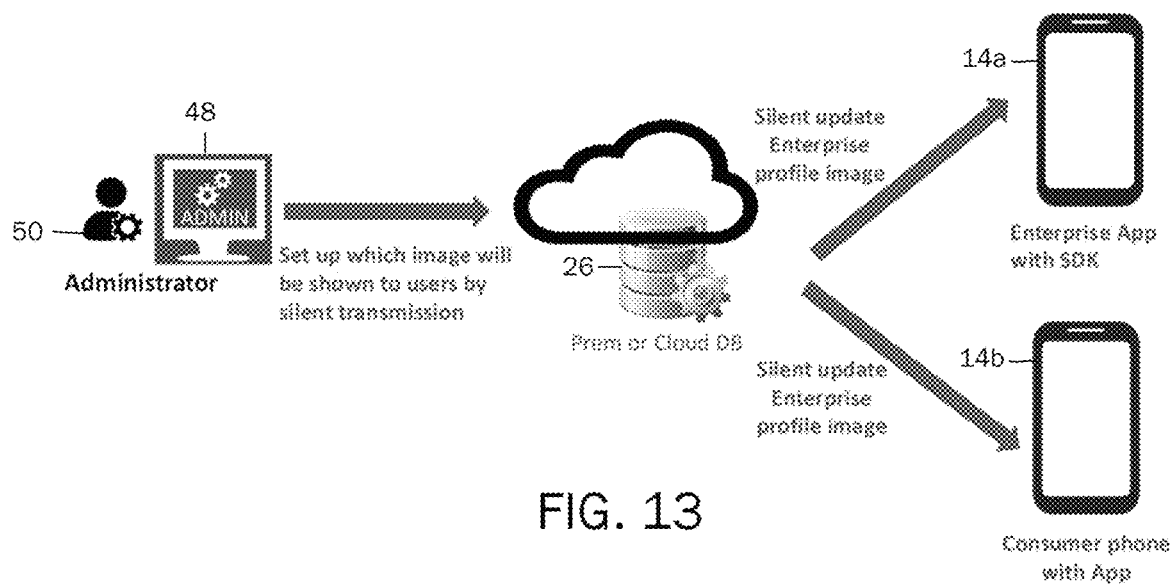
FIG. 13 is a block diagram illustrating an operational flow of an embodiment of the disclosure in which media content is delivered silently to a mobile application or an enterprise application.

The block diagram of FIG. 13 depicts yet another a possible use case for the system 10 where media content is delivered to the recipient node 14 without any interactivity with the user thereof. This use case contemplates the silent transmission/update of the media content element 38. In further detail, the administrator 50, possibly using the administration interface 48 of the system 10, sets the media content to be silently updated/transmitted, and stores the same on the database 26. Again, the database 26 may be an on-premises server computer system, or a remote or cloud-based system. In one case, the recipient node 14a is an enterprise application that is written as a custom software solution based on a software development kit (SDK). The SDK may be incorporated into a dedicated enterprise application that may be distributed to the recipient node 14 according to conventional modalities. Such an application may incorporate the additional functions of the features described herein and can be configured to communicate with the system 10 to do so. In another case, the recipient node 14b is a consumer mobile device on which a dedicated app has been installed. Either the SDK or the dedicated app is configured to communicate with the database 26 via a push-oriented system, where the database 26 originates the transmission of data without a precursor request from the recipient nodes 14.

Figure 14:
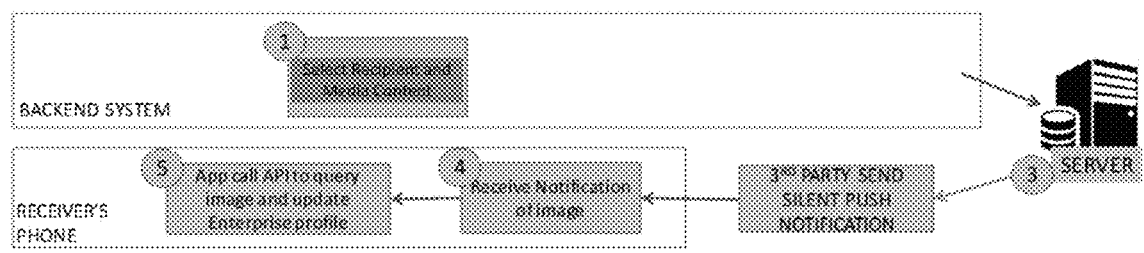
FIG. 14 is a diagram showing the operational flow according to an embodiment of the present disclosure.

FIG. 14 shows an example operational flow according to another embodiment of the present disclosure in relation to the system 10, and may begin within the sender's (enterprise's) back end system where the sender selects a recipient and image (step 1). Thereafter, the operational flow may continue with the updating the server/database 26 with the media content element 38. Upon committing this update, the operational flow continues with the sending a push notification to the recipient's mobile device (step 3), the push notification indicating that the image is available for display. The recipient's mobile device may then display the push notification (step 4) as a popup, a lock screen, or another screen where push notifications may be displayed. The recipient's mobile device may also update the image or other media content element 38 corresponding to the sender/enterprise in the mobile device's native contacts list and/or in the contacts list of the mobile application.

Figure 15:
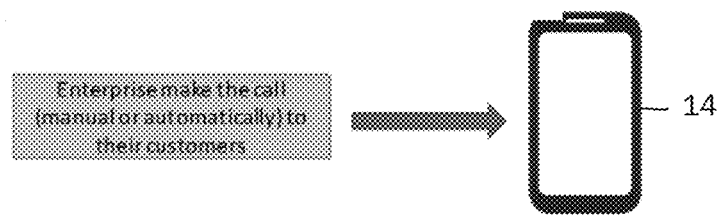
FIG. 15 is a block diagram illustrating an operational flow of an embodiment of the present disclosure in which media content is presented to the user concurrently with an incoming telephone call.
Figure 16:
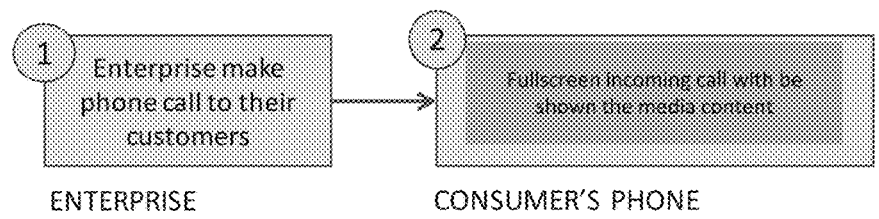
FIG. 16 is a diagram showing the operational flow according to another embodiment of the present disclosure.

Referring now to the diagram of FIGS. 15 and 16, upon providing the media content element 38 to the recipient node 14 silently without alerting the user as described above, it is possible for the originator node 12 to initiate a call, either automatically or manually, to the recipient nodes 14, e.g., the customer. As the call is incoming and the mobile device/recipient node 14 is alerting the user of the same, the previously transmitted media content element 38 may be presented. Additional information such as the validated identity of the originator node 12, the phone number from which the call is originating, and so on may also be presented. The diagram of FIG. 11 shows the operational flow from step 1 in which the call is placed, to step 2, in which the previously delivered media content element 38 is presented on the mobile device/recipient node 14.

Figure 17:
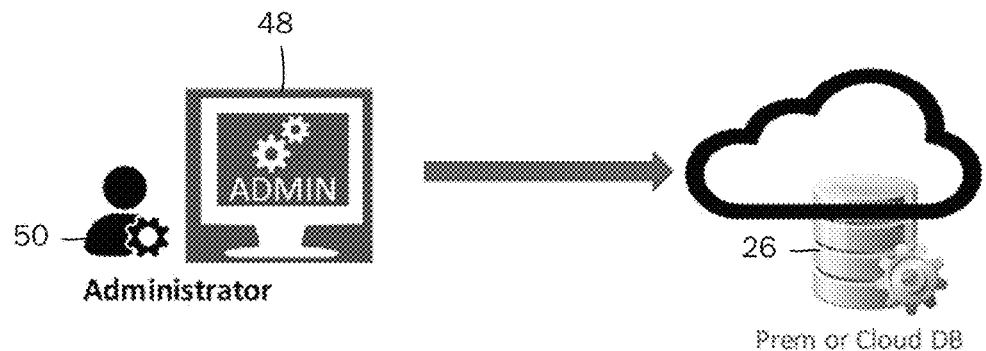
FIG. 17 is a block diagram showing an operational flow of the system operating as a content serving platform.
Figure 18:
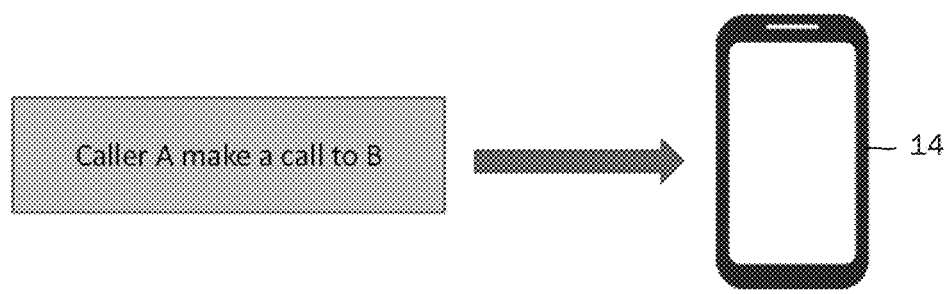
FIG. 18 is a diagram showing the operational flow according to an embodiment of the present disclosure.

Along these lines, the system 10 may also serve as a platform for delivering media content element 38 such as advertisements together with the placing of the call. Such advertisements may pertain to and originate from the business that originates the call, though it is expressly contemplated that advertisements from third parties may be similarly delivered. Again, as referred to herein, the media content element 38 includes further interactive elements that allow the call recipient to respond back or retrieve additional relevant information despite not answering the call. As shown in the block diagram of FIG. 17, the enterprise operator of the originator node 12 designates the specific media content element 38 for delivery to the recipient nodes 14 on the database 26. FIG. 18 illustrates that after the media content element 38 is so set up, the originator node 12 places a call to the recipient node 14, and the media content element 38 is presented on the recipient node 14.

The system 10 may be wholly or partly embodied in a computer including a processor (e.g. a CPU), a system memory (e.g. RAM), and a hard drive or other secondary storage device. The processor may execute one or more computer programs, which may be tangibly embodied along with an operating system in a computer-readable medium, e.g., the secondary storage device. The operating system and computer programs may be loaded from the secondary storage device into the system memory to be executed by the processor. The computer may further include a network interface for network communication between the computer and external devices (e.g. over the Internet).

The computer programs may comprise program instructions which, when executed by the processor, cause the processor to perform operations in accordance with the various embodiments of the present disclosure. The computer programs may be provided to the secondary storage by or otherwise reside on an external computer-readable medium such as a DVD-ROM, an optical recording medium such as a CD or Blu-ray Disk, a magneto-optic recording medium such as an MO, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computer via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

The disclosure is not intended to be limited to any specific interactions with a graphical user interface, and any known user-device interactions may be applicable, including but not limited to keyboard, mouse, touch, gesture, voice, eye-tracking, etc.

Although the foregoing examples variously refer to images presented to users, it is expressly contemplated that any data, including video data, audio data, text data, and any other data that may be visually represented may be substituted without departing from the scope of the present disclosure. Although the foregoing examples refer to mobile devices (e.g. smartphones, tablets, laptop computers) of the sender and receiver, it is contemplated that one or both of the mobile devices may instead be a computing device other than a mobile device, such as a desktop computer. In this case, the mobile application may be a desktop application (e.g. a web browser). As an example, a service provider may make use of an enterprise interface in the form of a desktop computer for sending out multi-media or visual notifications (e.g. appointment confirmations as described above) to consumer/customer mobile devices according to the embodiments of the disclosure. Furthermore, along these lines, the specific embodiments described above with respect to certain components performing the steps of the contemplated methods, that is, the functionalities being allocated or attributed to one mobile device or computing device or another, is likewise by way of example only and not of limitation. For instance, an administrative module may be provided to an enterprise via the aforementioned desktop application to perform one or more of the functions described above.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for establishing a communication session from an originator node on an originating carrier network to a recipient node on a terminating carrier network, the method comprising:
  receiving a communication initiation request from the originating carrier network, the communication initiation request corresponding to a telecommunication session initiated on the originator carrier network by the originator node to the recipient node, the originator node providing an asserted originator node identifier to the originating carrier network at the initiation of the telecommunication session;
  verifying, in response to receipt of the communications initiation request, the asserted originator node identifier as provided from the originator node through the originating carrier network against a certificate retrieved from a database to confirm that an identity of the originator node is that which it is asserted to be, the certificate being issued, pre-stored, and validated for the originator node separately and independently from the communication initiation request, the certificate being validated in response to satisfactorily passing an identity check verifying a pre-authorization to deliver specific identifying information to the recipient node that is an automated, manual, or combined automated and manual process, the certificate being reusable to validate the originator node with multiple different recipient nodes and unrestricted to the verification for communication sessions between the originated node and the recipient node;
  retrieving media content pre-associated with the originator node on the database upon the verification of the originator node with the pre-stored and validated certificate; and
  establishing a connection of the originating carrier network to the recipient node through the terminating carrier network, the telecommunication session being established between the originator node and the recipient node over the connected originating and terminating carrier networks, a communication session instruction and the media content being transmitted to the terminating carrier network, with the terminating carrier network, in response to the communication session instruction, establishing the telecommunications session and delivering the media content to the recipient node over the telecommunications session.

2. The method of claim 1, further comprising:
  transmitting a connection instruction to the terminating carrier network to establish the connection of the originating carrier network to the terminating carrier network for the communication initiation request based upon the verifying the identity of the originator node.

3. The method of claim 1, further comprising:
  logging the communications initiation request together with the asserted originator node identifier as a verified identity of the originator node.

4. The method of claim 1, wherein prior to the initiation of the telecommunication session by the originator node, the media content is transmitted to the database in association with the originator node.

5. The method of claim 1, wherein the recipient node is a mobile communications device.

6. The method of claim 1, wherein the media content is selected from a group consisting of: an image, a video sequence, an audio sequence, and an interactive graphical element.

7. The method of claim 6, wherein a different media content is associated with given geographic locations.

8. A system for establishing a communications session between an originator node and a recipient node over an originating network and a terminating network, the system comprising:
  an originating network interface connectible to the originating network and receptive to a media content request from the originating network, the media content request being associated with an originator node communications session request to the originating network;
  a database storing one or more originator node records each defined at least by an originator node identity, a network node address, and a media content element;
  a communications session processor connected to the incoming communications session network interface and the database, the communications session processor verifying an identity of the originator node as asserted thereby from the originator node identity against a certificate that is issued, pre-stored, validated for the originator node separately and independently of the communication session request, the certificate being validated in response to satisfactorily passing an identity check verifying a pre-authorization to deliver specific identifying information to the recipient node that is an automated, manual, or combined automated and manual process, the certificate being reusable to validate the originator node with multiple different recipient nodes and unrestricted to the verification for communication sessions between the originated node and the recipient node the communications session processor further retrieving from the database the media content element associated with the originator node record corresponding to the originator node communications session request received by the incoming communications session network interface;
  a terminating network interface receptive to a communication session instruction from the communications session processor to establish a telecommunications session on the terminating network in response, the media content element from the communications session processor being transmitted on to the terminating network for delivery to the recipient node through the terminating network interface over the telecommunications session.

9. The system of claim 8, further comprising:
  an administration interface connectible to the database, the originator node records and data stored therein being editable through the administration interface.

10. The system of claim 8, further comprising:
  a client updater connectible to the recipient node over an application programming interface (API) installed thereon.

11. The system of claim 10, wherein the recipient node includes a contact list with a contact record corresponding to the originator node.

12. The system of claim 10, wherein the recipient node includes a data record associated with the originator node, the client updater being operable to modify the data record through the API.

13. The system of claim 12, wherein the client updater provides multiple versions of data records associated with the originator node, a given one of the versions corresponding to a specific one of multiple sub-identities each linked to the originator node.

14. The system of claim 10, wherein the client updater transmits an updated media content element to the recipient node in response to an update of the media content on the database.

15. The system of claim 14, wherein the update to the media content on the recipient node is made without user interaction.

16. The system of claim 10, wherein the recipient node presents a verification prompt and presents the media content element in response to a validated response to the verification prompt.

17. The system of claim 10, wherein the media content element has an availability duration associated therewith, the media content element being rendered inaccessible upon expiration of the availability duration.

18. The system of claim 17, wherein the communications session processor sends a push notification to the recipient node, the push notification indicating that the media content element is available for display for the availability duration.

19. The system of claim 8, wherein communications session is a telephone call.

20. The system of claim 8, wherein the recipient node is a mobile communications device.

21. A non-transitory program storage medium on which are stored instructions executable by a processor or programmable circuit to perform operations for establishing a communications session between an originator and a recipient, the operations comprising:
  receiving a communication initiation request from an originator carrier network, the communication initiation request corresponding to a telecommunication session initiated on the originator carrier network by the originator node to the recipient node, the originator node providing an asserted originator node identifier to the originating carrier network at the initiation of the telecommunication session;
  verifying, in response to receipt of the communications initiation request, the asserted originator node identifier as provided from the originator node through the originating carrier network against a certificate retrieved from a database to confirm that an identity of the originator node is that which it is asserted to be, the certificate being issued, pre-stored, and validated for the originator node separately and independently from the communication initiation request, the certificate being validated in response to satisfactorily passing an identity check verifying a pre-authorization to deliver specific identifying information to the recipient node that is an automated, manual, or combined automated and manual process, the certificate being reusable to validate the originator node with multiple different recipient nodes and unrestricted to the verification for communication sessions between the originator node and the recipient node;
  retrieving media content pre-associated with the originator node on the database upon the verification of the originator node with the pre-stored and validated certificate; and
  establishing a connection of the originating carrier network to the recipient node through the terminating carrier network, the telecommunication session being established between the originator node and the recipient node over the connected originating and terminating carrier networks, a communication session instruction and the media content being transmitted to the terminating carrier network, the terminating carrier network, in response to the communication session instruction, establishing the telecommunications session and delivering the media content to the recipient node over the telecommunications session.

22. The non-transitory program storage medium of claim 21, wherein the operations further includes transmitting a connection instruction to the terminating carrier network to establish the connection of the originating carrier network to the terminating carrier network for the communication initiation request based upon the verifying the identity of the originator node.

23. The non-transitory program storage medium of claim 22, wherein the originating carrier network and the terminating carrier network are part of the same overall network.

24. The non-transitory program storage medium of claim 21, wherein prior to the initiation of the telecommunication session by the originator node, the media content is transmitted to the database in association with the originator node.

25. The non-transitory program storage medium of claim 21, wherein the operations further includes logging the communications initiation request together with the asserted originator node identifier as a verified identity of the originator node.

26. The non-transitory program storage medium of claim 21, wherein the recipient node is a mobile communications device.

27. The non-transitory program storage medium of claim 21, wherein the media content is selected from a group consisting of: an image, a video sequence, and an interactive graphical element.

28. The non-transitory program storage medium of claim 27, wherein a different media content is associated with given geographic locations.

29. The non-transitory program storage medium of claim 21, wherein the telecommunication session is a telephone call.

* * * * *